United States Patent
Parrenin et al.

(10) Patent No.: US 11,062,815 B2
(45) Date of Patent: Jul. 13, 2021

(54) ANTI-RETENTION SEALING JOINT FOR A PANEL FIXED TO A HOLDING FRAME DELIMITING A CLOSED SPACE

(71) Applicant: COMMISSARIAT A L'ENERGIE ATOMIQUE ET AUX ENERGIES ALTERNATIVES, Paris (FR)

(72) Inventors: Cedric Parrenin, Til-Chatel (FR); Raphael Bay, Quetigny (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 244 days.

(21) Appl. No.: 16/008,547

(22) Filed: Jun. 14, 2018

(65) Prior Publication Data

US 2018/0374594 A1   Dec. 27, 2018

(30) Foreign Application Priority Data

Jun. 16, 2017   (FR) ...................................... 17 55500

(51) Int. Cl.
| | |
|---|---|
| *G21F 7/053* | (2006.01) |
| *G01B 3/32* | (2006.01) |
| *B25J 21/02* | (2006.01) |
| *B25J 19/00* | (2006.01) |
| *B65D 83/08* | (2006.01) |

(52) U.S. Cl.
CPC .......... *G21F 7/053* (2013.01); *B25J 19/0075* (2013.01); *B25J 21/02* (2013.01); *G01B 3/32* (2013.01); *B65D 83/0894* (2013.01)

(58) Field of Classification Search
None
See application file for complete search history.

(56) References Cited

U.S. PATENT DOCUMENTS

| | | | | |
|---|---|---|---|---|
| 3,088,627 A | | 5/1963 | Saunders | |
| 4,546,874 A | * | 10/1985 | Kirchhan | ............... B65D 53/02 |
| | | | | 220/4.22 |
| 5,113,078 A | * | 5/1992 | Takashi | ..................... G21F 1/12 |
| | | | | 250/515.1 |
| 5,785,201 A | * | 7/1998 | Bordner | ............. B65D 43/0218 |
| | | | | 206/508 |
| 6,307,206 B1 | * | 10/2001 | Riviere | ..................... B25J 21/02 |
| | | | | 250/453.11 |

FOREIGN PATENT DOCUMENTS

| | | |
|---|---|---|
| EP | 0 430 687 A1 | 6/1991 |
| EP | 1 095 607 A2 | 5/2001 |
| FR | 3 021 076 B1 | 6/2017 |
| WO | WO 2010/115962 A1 | 10/2010 |

OTHER PUBLICATIONS

French Preliminary Search Report dated Mar. 13, 2018 in French Application 17 55500 filed on Jun. 16, 2017 (with English Translation of Categories of Cited Documents).

* cited by examiner

*Primary Examiner* — Matthew D Krcha
(74) *Attorney, Agent, or Firm* — Oblon, McClelland, Maier & Neustadt, L.L.P.

(57) ABSTRACT

A seal for a glove box panel includes a first face and a second face parallel to each other and designed to come into contact with a profile of the glove box and against an internal face of the panel. The seal includes an internal circumferential edge with a rim projecting beyond the first face.

17 Claims, 3 Drawing Sheets

ANTI-RETENTION SEALING JOINT FOR A PANEL FIXED TO A HOLDING FRAME DELIMITING A CLOSED SPACE

TECHNICAL DOMAIN

The invention relates to a closed chamber of the glove box type to manipulate radioactive material.

STATE OF PRIOR ART

A glove box type chamber is formed from a rigid supporting structure or frame, usually parallelepiped in shape, onto which panels are added that can be transparent and fixed to this structure in a sealed manner, such an arrangement being described in patent application FR3021076.

In this arrangement shown on FIGS. 1 and 2, the edge of a panel 1 is applied in contact with a profile 2 delimiting a supporting structure by seal clamp strips 3, this profile having a bearing sidewall 4 prolonged by a flange 6. The panel 1 bears on its inside face 7 in contact with the sidewall 4 of the profile, through a seal 8, the assembly being compressed by the strip 3.

This seal-clamp strip 3 has a U-shaped cross-section comprising a base 9 prolonged by two parallel sidewalls 11, 12, this base facing the flange 6, the fixed sidewall 11 bearing on the bearing sidewall 4 of the profile, and the clamping sidewall 12 facing the external face of the panel.

This clamping sidewall 12 comprises a bearing pad or mating frame 13 on its internal surface, supported by tightening screws and that uniformly distributes the clamping force to homogenise the stress in the panel.

As can be seen on FIGS. 1 and 2, the assembly composed of the panel 1, the seal 8 and the profile 2 delimit an internal groove 14 extending inside the chamber. The bottom of this groove 14 corresponds to the top edge of the seal 8 and the sides of this groove are delimited by the panel 1 and the sidewall 4 of the profile.

This internal groove 14 is a problem in that it forms a large niche inside which nuclear material can be retained. One possibility consists of adding aluminium adhesive tape 16 when the glove box is put into service, such that one edge is glued to the profile 2 and the other edge is glued to the internal face of the panel 1 to cover this groove such that it does not form a retention zone.

When the panel has to be replaced, this adhesive tape has to be removed, which is a particularly painstaking operation. Such a panel is replaced without breaking the confinement by fixing the edge of an envelope forming a bag to the glove box around the panel to be replaced, to separate the panel to be replaced from the structure and to put it into place at the bottom of the envelope forming a bag.

The envelope forming a bag is then crimped close to the removed panel and close to the glove box, and is then cut between these crimpings to form one crimped portion that contains the removed panel, and another crimped portion that closes the opening in the glove box.

The part of the envelope that closes the opening is then placed inside the box, so that the new panel can be placed on the opening and fixed to it. The remaining part of the envelope located inside the chamber is then pulled inwards into the box, by an operator working from outside with gloves passing through the new panel. The seal-clamp strip can then be tightened.

The adhesive 16 covering the groove 14 thus has to be removed before the panel can be replaced. In practice, an operator acts from outside after engaging his arms in gloves supported by the openings in the panel, to access the region of the internal groove so as to remove the adhesive using tools that he manipulates with his gloved hands. This operation is particularly difficult because it has to be done all round the periphery of the panel to be replaced.

The purpose of the invention is to provide a solution to correct this disadvantage.

PRESENTATION OF THE INVENTION

To achieve this, the purpose of the invention is a seal for a glove box panel comprising a first contact face and a second contact face parallel to each other and designed to come into contact with a profile of the glove box and against an internal face of the panel, this seal comprising an internal circumferential edge with a rim projecting beyond the first face.

With this solution, the rim projecting beyond the first face closes the location of the internal groove so that such an internal groove is not formed. Therefore it is no longer necessary to provide an adhesive to be added inside the glove box along the edge delimited by the clamping profile and the add-on panel.

Another purpose of the invention is a seal thus defined, in which the rim is a quarter-round shape.

Another purpose of the invention is a seal thus defined, in which the rim comprises a first lip projecting from the first contact face and a second lip projecting from the second contact face.

Another purpose of the invention is a seal thus defined, comprising an external circumferential rim prolonged by a skirt extending perpendicular to the second contact face projecting beyond this second contact face to surround and clamp the edge of the panel around its entire circumference.

Another purpose of the invention is a seal thus defined, in which the skirt is terminated by a perpendicular rim to jointly delimit a section with a shape like the letter U, with the second contact face and the skirt.

Another purpose of the invention is a glove box comprising a supporting structure delimiting an opening closed by a panel pressed into contact with a profile delimiting this opening, with a seal thus defined inserted between the panel and the profile.

DETAILED PRESENTATION OF PARTICULAR EMBODIMENTS

Figure 1:
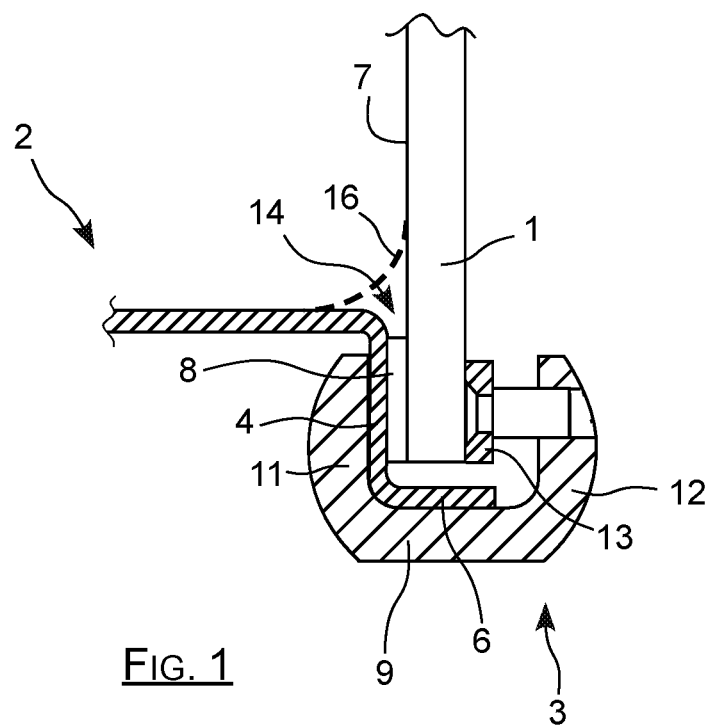
FIG. 1, already described, is a cross-sectional view of a glove box panel attachment arrangement known in Prior art.
Figure 2:
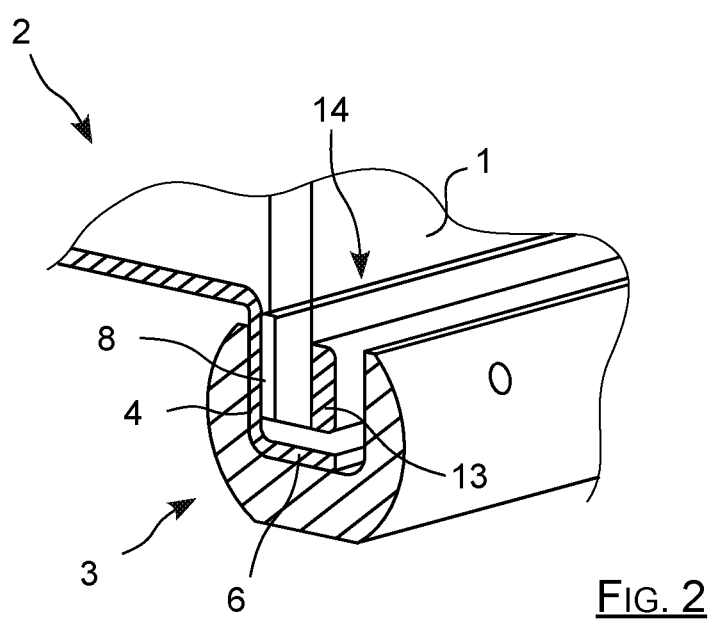
FIG. 2, already described, is a perspective view of a glove box panel attachment arrangement known in Prior art.
Figure 3:
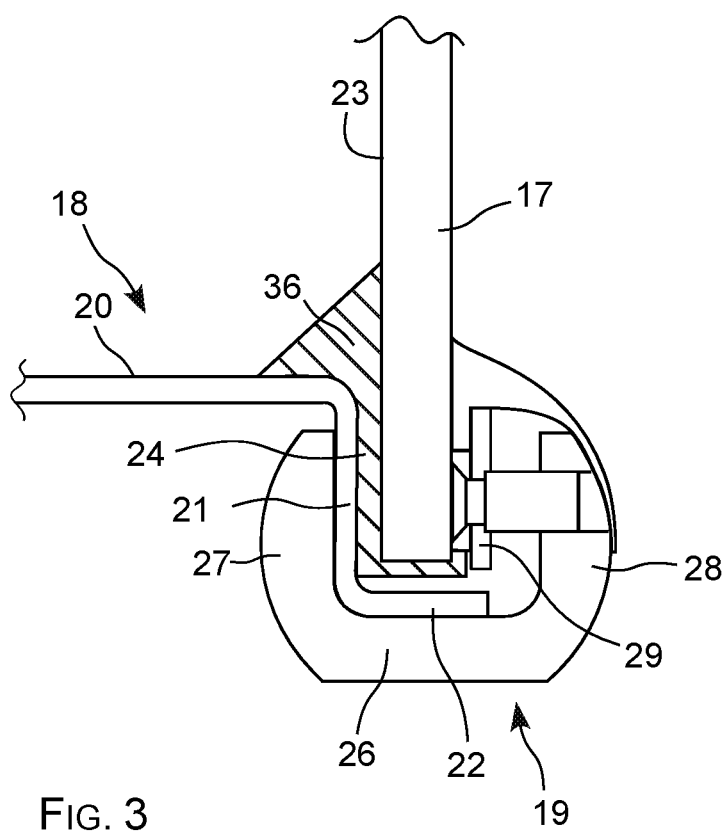
FIG. 3 is a cross-sectional view of an attachment arrangement with a seal according to the invention.

FIG. 3 shows an assembly according to the invention, in which a panel 17 is forced into contact with a profile of a supporting structure 18 by seal-clamp strips 19. This profile 18 has a cross-section comprising a body 20 prolonged by a bearing sidewall 21 extending at a right angle to the body 20 and terminated by a rim 22 folded at a right angle relative to this sidewall and consequently parallel to the body 20. The panel 17 has its inside face 23 pressed in contact with the bearing sidewall 21, through a seal 24, the assembly being compressed by the seal-clamp strip 19.

This strip 19 has a U-shaped cross-section comprising a base 26 prolonged by two parallel sidewalls 27, 28. When the assembly is mounted, the base 26 is facing the rim 22, the fixed sidewall 27 is bearing on the bearing sidewall 21 of the profile, and the clamping sidewall 28 of the strip 19 is facing the panel 17.

This clamping sidewall 28 comprises a bearing pad or mating frame 29 on the inside face, supported by tightening screws passing through this clamping sidewall 28 to uniformly distribute the clamping force applied by screws on the panel.

The seal 24 has a generally rectangular shape with dimensions that correspond to the dimensions of the periphery of the rectangular panel 17. This seal 24 comprises a first contact face mark 31 on FIG. 4 and bearing on the profile 18, and a second contact face denoted 32 on FIG. 4, parallel to the first and bearing in contact with the internal face 23 of the panel 17 around its entire perimeter.

This seal 24 comprises an internal circumferential edge 33 and an external circumferential edge 34 separated from each other by a distance forming its width that corresponds approximately to the width of the bearing sidewall 21, so as to cover most of this sidewall 21 when the assembly is in position.

Figure 4:
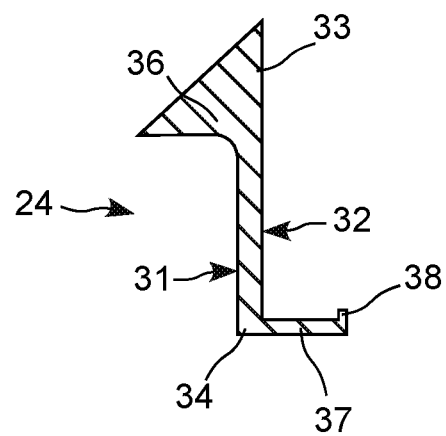
FIG. 4 is a cross-sectional view of a seal according to the invention shown by itself.

As can be seen on FIG. 4, the internal edge 33 is provided with a spur 36 or excrescence also visible on FIG. 3, with an approximately triangular section that projects significantly beyond its first face 31, so as to fill in the internal groove found in Prior Art.

Figure 5:
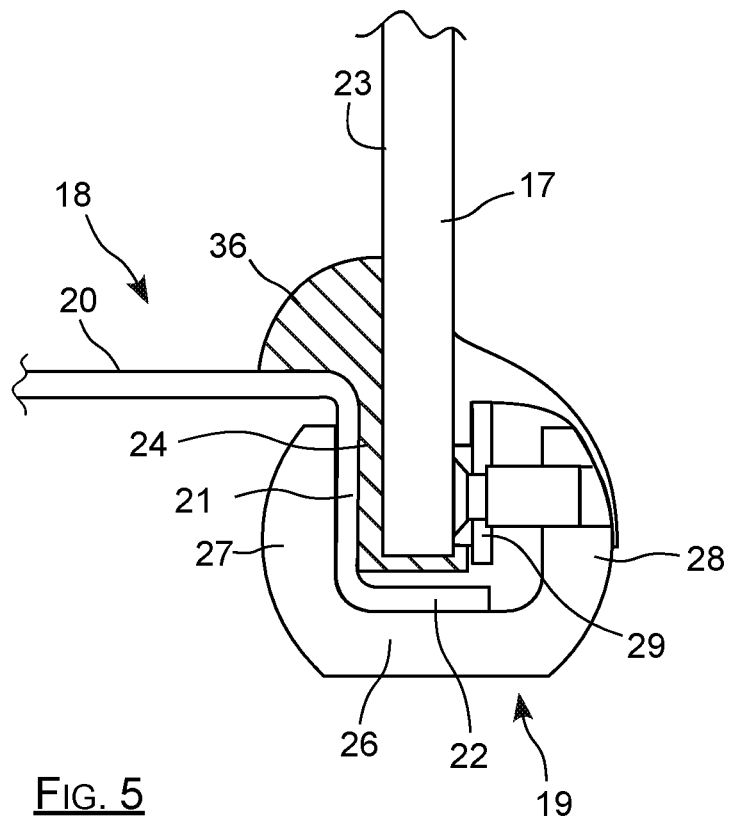
FIG. 5 is a cross-sectional view of an attachment arrangement with a seal according to one variant of the invention.

Due to thus spur or internal rim 36, when the assembly is in position as shown on FIG. 3 or 5, there is no internal groove that could form a retention niche in which radioactive material can accumulate. Therefore there is no need to allow for the addition and removal of an adhesive covering the angle delimited by the body 20 of the profile and by the internal face of the panel, as was the case in Prior art.

In the example in FIGS. 3 and 4, the spur has a triangular section, but it could just as advantageously have a quarter-round section as illustrated on FIG. 5. This quarter-round section facilitates placement of the panel with its seal without any risk of the joint becoming jammed during handling and positioning of the assembly. In other words, this quarter-round shape makes the seal stiffer, that in particular prevents its edge from turning up. This quarter-round shape of the edge 36 also facilitates cleaning of the seal when it is put into place in the chamber, for example during a glove box maintenance operation.

Figure 6:
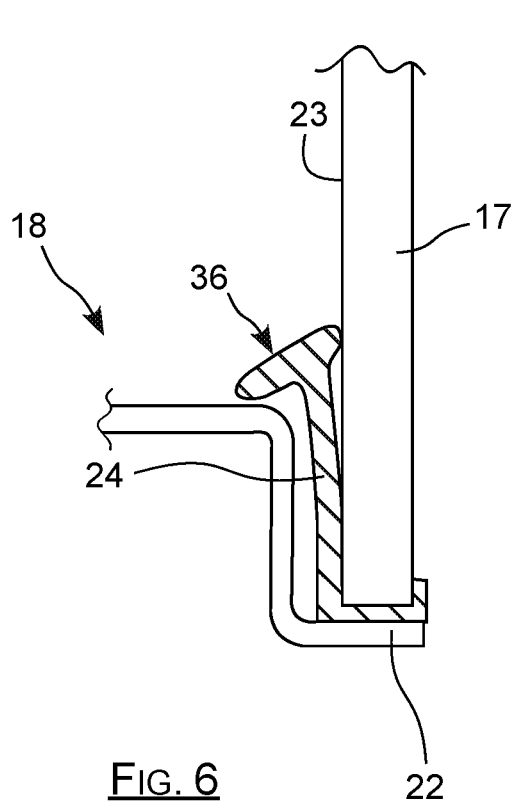
FIG. 6 is a cross-sectional view of an attachment including a seal according to another variant of the invention.
Figure 7:
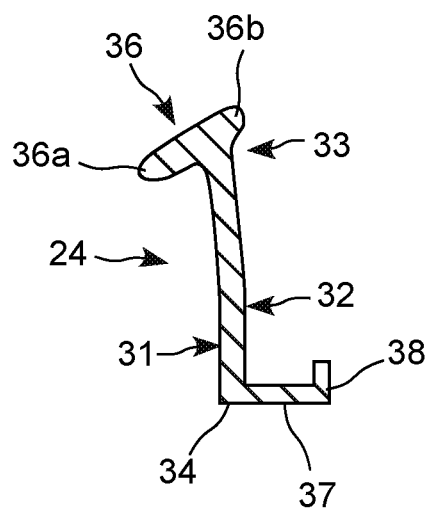
FIG. 7 is a cross-sectional view of a seal according to another variant of the invention shown by itself.
Figure 8:
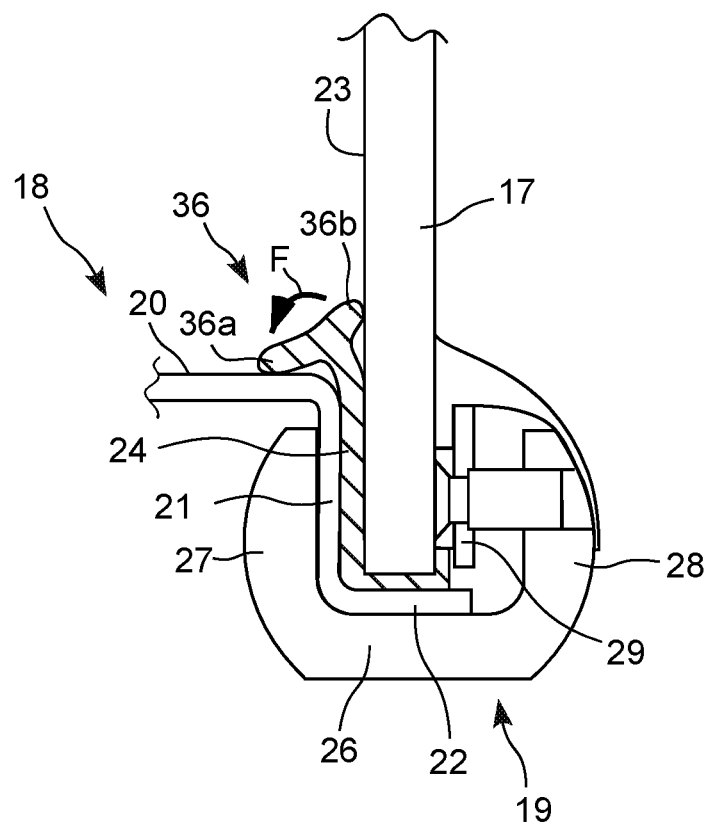
FIG. 8 is a cross-sectional view of an attachment arrangement mounted with a seal according to another variant of the invention.

Another possible means of limiting turning up of the edge of the seal during installation of the assembly consists of making the shape of the spur or the internal edge 36 like the letter T. In this configuration shown on FIGS. 6 to 8, the internal circumferential edge 33 of the seal comprises a spur 36 with a first branch or lip 36a projecting from its first contact face 31 and a second branch or lip 36b projecting from its second contact face 32.

In this case, when the panel 17 is brought into place and pressed towards the bearing sidewall 21 when the seal is installed, this panel 17 bears firstly on the second lip 36b projecting from the second contact face 32. This bearing makes the spur 36 tilt along the direction of arrow F on the figure to lower the first lip 36a towards the body of the profile 18, without any risk of this first lip turning up.

Complementarily, the external circumferential edge 34 is prolonged by a skirt 37 that projects beyond its second contact face 32, in other words along a direction opposite to the direction of the spur 36, prolonging the external edge 34 around the entire circumference of the seal. This skirt 37 is terminated by a perpendicular rim 38 extending parallel to faces 31 and 32, such that the body of the seal with its skirt and its rim 38 jointly delimit a U-shaped section.

As can be seen on FIGS. 3 and 5, this skirt 37 enables the seal 24, when it is in position, to surround the edge of the panel 17 while clamping it, in other words to stay fixed to the panel with precise positioning, without the need to provide any glue. In other words, when an old panel is being replaced by a new panel, the new panel can easily be pre-equipped with a new precisely positioned seal firmly held in place on the panel, which facilitates placement of this new panel after removing the old panel.

In the described example, the invention has been presented for a glove box designed for use in the manipulation of nuclear materials, but it can be applied to other fields, for example hospitals. It can be applied to incubators, work on viruses or on chemicals or bacteriological agents.

The invention claimed is:

1. A seal for installation of a rectangular panel on a supporting structure of a glove box, the seal comprising:
    a first contact face and a second contact face parallel to each other and designed to come into contact with a profile of the glove box supporting structure and against an internal face of the panel;
    an internal circumferential edge provided with a rim projecting beyond the first contact face; and
    an external circumferential edge prolonged by a skirt extending perpendicular to the second contact face projecting beyond the second contact face to surround and clamp the edge of the panel around its entire circumference, and the skirt is terminated by a perpendicular rim that is perpendicular to the skirt, the skirt extends in a straight line from the second contact face to an inner face of the perpendicular rim, and a bottom face of the skirt is planar and, when the skirt is horizontal, the bottom face of the skirt is the bottom-most edge of the seal,
    wherein the internal circumferential edge is positioned at a first end of the first contact face and the second contact face and the external circumferential edge is positioned at a second end of the first contact face and the second contact face such that the first contact face and the second contact face extend between the internal circumferential edge and the external circumferential edge.

2. The seal according to claim 1, in which the rim has a quarter-round shape.

3. The seal according to claim 1, in which the rim comprises a first lip projecting from the first contact face and a second lip projecting from the second contact face.

4. The seal according to claim 1, in which the skirt is terminated by the perpendicular rim that is perpendicular to the skirt to jointly delimit a section with a shape like the letter U, with the second contact face and the skirt.

5. A glove box comprising:
    a supporting structure including an opening closed by a panel pressed into contact with a profile delimiting the opening; and the seal according to claim 1 inserted between the panel and the profile.

6. The glove according to claim 5, in which the skirt is terminated by the perpendicular rim that is perpendicular to the skirt and parallel to the first contact face and the second contact face, and the perpendicular rim is in contact with an external face of the panel.

7. The seal according to claim 1, in which the rim has a triangular shape.

8. The seal according to claim 1, in which the rim extends to an upper edge of the seal.

9. The seal according to claim 1, in which a height of the perpendicular rim is less than a height of the first contact face and a height of the second contact face.

10. The seal according to claim 1, in which the perpendicular rim that is perpendicular to the skirt includes an outer edge that is planar and when the skirt is horizontal, the outer edge of the perpendicular rim is the rightmost edge of the seal.

11. A glove box comprising:
- a supporting structure including an opening closed by a panel including glove openings having gloves attached thereto, the panel being pressed into contact with a profile delimiting the opening; and
- a seal comprising:
  - a first contact face and a second contact face parallel to each other and designed to come into contact with a profile of the glove box supporting structure and against an internal face of the panel,
  - an internal circumferential edge provided with a rim projecting beyond the first contact face, and
  - an external circumferential edge prolonged by a skirt extending perpendicular to the second contact face projecting beyond the second contact face to surround and clamp the edge of the panel around its entire circumference,
- wherein the internal circumferential edge is positioned at a first end of the first contact face and the second contact face and the external circumferential edge is positioned at a second end of the first contact face and the second contact face such that the first contact face and the second contact face extend between the internal circumferential edge and the external circumferential edge.

12. The glove box according to claim 11, in which the rim has a quarter-round shape.

13. The glove box according to claim 11, in which the rim comprises a first lip projecting from the first contact face and a second lip projecting from the second contact face.

14. The glove box according to claim 11, in which the skirt is terminated by the perpendicular rim that is perpendicular to the skirt to jointly delimit a section with a shape like the letter U, with the second contact face and the skirt.

15. The glove box according to claim 11, in which the rim has a triangular shape.

16. The glove box according to claim 11, in which the rim extends to an upper edge of the seal.

17. The glove box according to claim 11, in which a height of the perpendicular rim is less than a height of the first contact face and a height of the second contact face.

\* \* \* \* \*